Nov. 4, 1924.
W. W. BLAKELY
1,513,960
HOLDDOWN DEVICE FOR VEHICLES
Filed July 24, 1922
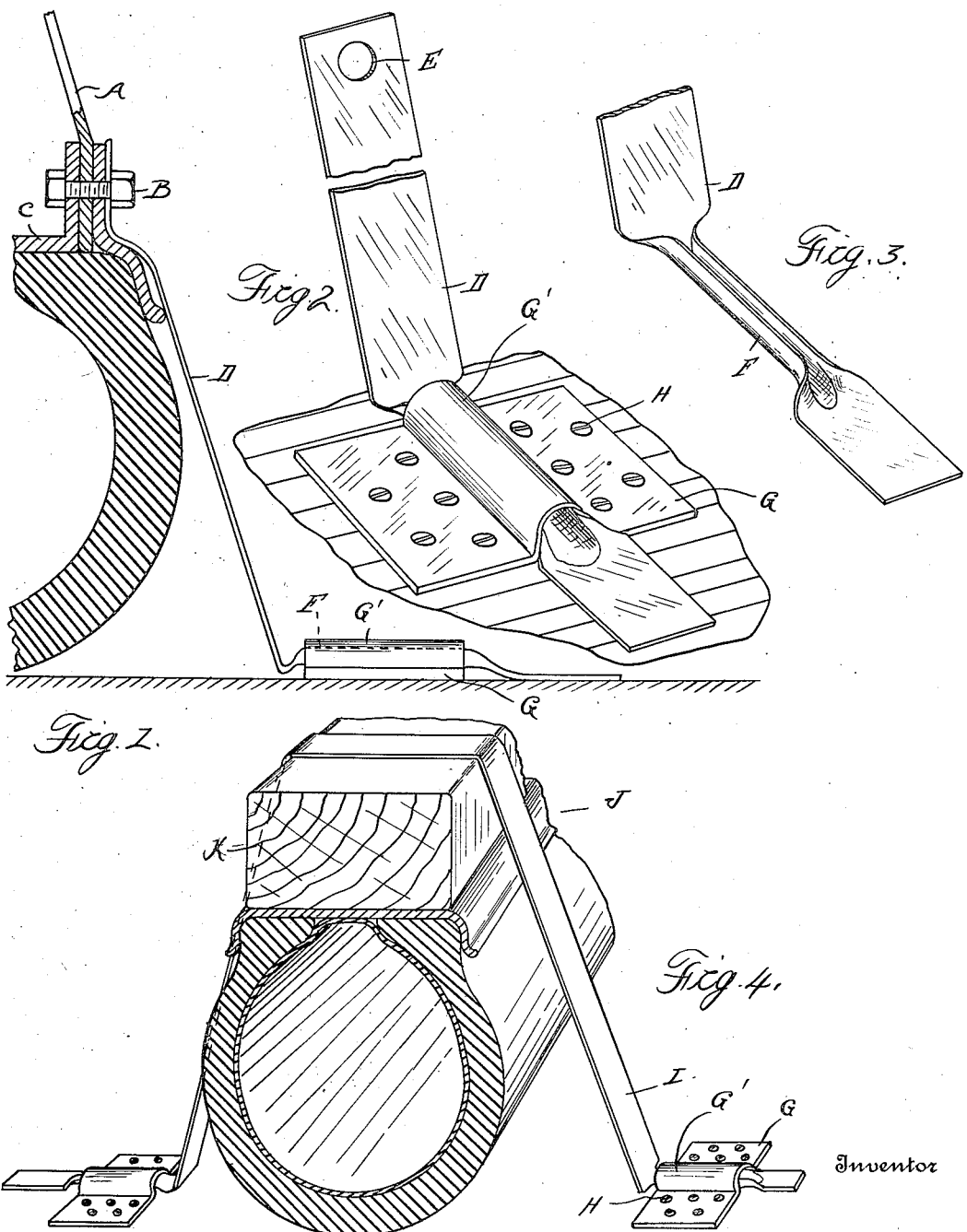

Patented Nov. 4, 1924.

1,513,960

UNITED STATES PATENT OFFICE.

WILLIAM W. BLAKELY, OF DETROIT, MICHIGAN.

HOLDDOWN DEVICE FOR VEHICLES.

Application filed July 24, 1922. Serial No. 577,179.

*To all whom it may concern:*

Be it known that I, WILLIAM W. BLAKELY, a citizen of the United States of America, residing at Detroit, in the county of Wayne and State of Michigan, have invented certain new and useful Improvements in Holddown Devices for Vehicles, of which the following is a specification, reference being had therein to the accompanying drawings.

This invention relates to hold-down devices such as are employed in freight cars or other carriers for preventing movement of a vehicle being shipped.

It is the object of the invention to provide a hold-down device comprising a tie member engageable with a wheel or some other portion of the vehicle, and an anchorage member pivotally engageable by said tie member and attachable to a floor or wall of a carrier, the pivotal connection allowing a limited movement of the vehicle relative to the anchorage, so as to prevent excessive strain upon the tie member.

In the drawings:—

Figure 1 is a view of the tie member in use; showing in cross section a portion of the engaged wheel;

Figure 2 is a perspective view of the tie member engaged with its anchorage plate but detached from the vehicle wheel;

Figure 3 is a somewhat similar view, omitting the anchorage plate;

Figure 4 is a cross section view of the rim of a wheel engaged by a modified form of hold-down device.

In these views the reference character A designates a wheel of a vehicle undergoing shipment, and B one of the bolts whereby the rim C of said wheel is secured to the body thereof. D is a tie member formed of strap iron and apertured at one end as indicated at E to engage one of the bolts B. The other or lower end portion of the member D is bent at an angle to the main body of the tie member somewhat greater than 90° and is in part fashioned to a cylindrical form, as indicated at F. The portion F has the nature of a journal member engageable with a bearing formed by an arched portion G' of a plate G nailed, as indicated at H, to the floor of a freight car or other carrier. The journal portion F of the tie member D is formed intermediately of the bent lower end portion of said tie member, so that there is a portion of the bent end at each side of the bearing G' which has the full width of the tie member and prevents the latter from moving axially within the bearing member.

In the modified construction shown in Figure 4 a strap iron tie member I of arch formation is employed straddling the rim portion of a wheel J and bearing upon the felly K.

In both of the described constructions the vehicle is permitted a limited freedom of movement in the plane of the wheels thereof by rocking of the journal portions of the tie members in the bearing portions G' of the attachment plates G. Flexibility of the tie members also permits a limited movement of the vehicle transverse to the plane of the wheels. Through the use of strap metal as the material for the tie members their thickness transverse to the plane of the wheels may be materially reduced, since the necessary strength is derived from the relatively large dimension parallel to said plane. Thus a material is employed which sacrifices flexibility in one direction to secure this characteristic in the transverse direction but compensation is made for the decreased flexibility in the first mentioned direction by a pivotal engagement of the tie member with its attachment plate.

While in the illustrated and described forms of the invention the tie member is engaged with the wheel of the vehicle, it will be readily understood that the invention extends to a connection of the tie member with any portion of the vehicle.

What I claim as my invention is:—

1. An anchorage device for a wheeled vehicle, comprising a tie member attachable at one end to a vehicle, and means for pivotally securing the other end of said tie member to a fixed surface with the pivotal axis transverse to the wheels of the vehicle.

2. An anchorage device, comprising a tie member attachable to a wheeled vehicle, and an anchorage plate attachable to a fixed surface and pivotally engaged by an end portion of said tie member the axis of pivotal engagement being transverse to the wheels of the vehicle.

3. An anchorage device, comprising a tie member engaging a vehicle, and having an end portion bent and fashioned to intermediately form a reduced journal portion, and an attachment plate for said tie member adapted to be secured to a fixed surface, and having a bearing engageable with said journal portion.

4. An anchorage device, comprising a tie member formed of strap metal, and having an end portion fashioned to an approximate cylindrical form to provide a journal member, and an attachment plate for said tie member having a bearing engageable by said journal member.

5. An anchorage device, comprising a tie member formed of strap metal, bent at one end to form a securing foot, said foot having an intermediate portion reduced in width and fashioned to form a journal member, and an attachment plate having a bearing engageable by said journal member.

6. An anchorage device, comprising a tie member attachable to a vehicle and having a foot portion intermediately fashioned to form a reduced journal, and an anchorage member embracing said journal to pivotally secure said foot portion to a fixed surface.

7. An anchorage device comprising a tie member formed of strap metal bent at one end to form a securing foot, said foot having an intermediate portion reduced in width, and anchorage means engaging said reduced portion.

In testimony whereof I affix my signature.

WILLIAM W. BLAKELY.